(12) United States Patent
Kim et al.

(10) Patent No.: US 8,505,970 B2
(45) Date of Patent: Aug. 13, 2013

(54) AIRBAG CUSHION FOR VEHICLES

(75) Inventors: Eung Man Kim, Hwaseong-si (KR);
Taeg Young Ahn, Hwaseong-si (KR);
Hak Muk Park, Seongnam-si (KR);
Jong Hyuk Kim, Chungcheongnam-do (KR)

(73) Assignees: Hyundai Motor Company, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/316,537

(22) Filed: Dec. 11, 2011

(65) Prior Publication Data
US 2013/0062870 A1 Mar. 14, 2013

(30) Foreign Application Priority Data
Sep. 8, 2011 (KR) .................. 10-2011-0090990

(51) Int. Cl.
*B60R 21/16* (2006.01)
(52) U.S. Cl.
USPC ...................... 280/743.2; 280/739
(58) Field of Classification Search
USPC ............... 280/739, 743.1, 743.2, 742
See application file for complete search history.

(56) References Cited

U.S. PATENT DOCUMENTS

| | | | | |
|---|---|---|---|---|
| 6,616,184 | B2 * | 9/2003 | Fischer ...................... | 280/743.2 |
| 6,736,426 | B2 * | 5/2004 | Winters et al. ............. | 280/743.2 |
| 7,695,013 | B2 * | 4/2010 | Kakstis et al. ............. | 280/743.1 |
| 8,070,183 | B2 * | 12/2011 | Kumagai et al. ........... | 280/743.2 |
| 2006/0290117 | A1 * | 12/2006 | Fischer et al. ................ | 280/739 |
| 2007/0216146 | A1 * | 9/2007 | Williams et al. ............. | 280/739 |
| 2009/0039630 | A1 * | 2/2009 | Schneider et al. ............ | 280/740 |
| 2009/0218795 | A1 * | 9/2009 | Fukawatase et al. ......... | 280/736 |
| 2009/0230663 | A1 * | 9/2009 | Mills et al. ..................... | 280/735 |
| 2009/0256338 | A1 * | 10/2009 | Williams ....................... | 280/735 |
| 2010/0078924 | A1 * | 4/2010 | Mitsuo et al. ............... | 280/743.2 |
| 2010/0090445 | A1 * | 4/2010 | Williams et al. ........... | 280/728.2 |

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

An airbag cushion for vehicles includes a cushion body, vent holes, tubes and a tether. The vent holes are formed in the cushion body at opposite positions. The tubes are connected to the respective vent holes. The tubes are deployed out of the vent holes by deployment of the cushion body so that gas is discharged out of the cushion body through the tubes. The tether connects the tubes to each other and is severed when pressure in the cushion body reaches a predetermined degree. At the point of time at which the weight of the occupant is applied to the airbag cushion, the pressure in the airbag cushion is released, thus reducing the risk of the deployment of the airbag cushion injuring the occupant.

5 Claims, 2 Drawing Sheets

AIRBAG CUSHION FOR VEHICLES

CROSS-REFERENCE TO RELATED APPLICATION

The present application claims priority of Korean Patent Application Number 10-2011-0090990 filed Sep. 8, 2011, the entire contents of which application is incorporated herein for all purposes by this reference.

BACKGROUND OF INVENTION

1. Field of Invention

The present invention relates to an airbag cushion for vehicles which can mitigate the risk of deployment of the airbag injuring an occupant.

2. Description of Related Art

Generally, an airbag system is installed in a vehicle to protect an occupant in the vehicle from impact during a vehicle collision.

In the airbag system, an airbag cushion is disposed in an airbag housing in a folded state under normal conditions. In a vehicle collision, an inflator rapidly supplies gas into the airbag cushion in response to the sensing of a sensor so that the airbag cushion deploys instantaneously, thus protecting the occupant from impact during the collision.

However, if the pressure in the airbag cushion when deploying is comparatively high to reliably reduce the risk of injury of the neck of the occupant, the back of the head of the occupant may strike the headrest of a seat due to instantaneous inflation pressure of the airbag cushion, resulting in the occupant injuring his/her head.

In an effort to overcome the above problem, as shown in FIG. 1, a technique was proposed, in which vent holes 2 are formed on opposite sides of the airbag cushion 1 so that when the airbag cushion 1 deploys, gas injected into the airbag cushion 1 is discharged early out of the vent holes 2 to prevent the airbag cushion 1 from striking the occupant because its pressure of inflation is excessively high.

However, in this conventional airbag cushion, because the vent holes open even at the initial stage of deployment of the airbag cushion, an excessive pressure loss may be caused during the deployment of the airbag cushion. Thereby, the airbag cushion may not be able to correctly restrain the occupant at the initial stage of the vehicle collision, thus inducing a change in the injury conditions of the occupant.

To solve this problem, an active vent was proposed. The active vent is provided in an airbag module so that an airbag cushion is rapidly deployed by high pressure at the initial stage of its deployment, and the pressure in the airbag cushion is released at a point of time at which the weight of the occupant is applied to the airbag cushion.

However, additional installation expenses are required for the active vent, thus increasing the production cost of the airbag module.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an airbag cushion for vehicles which reduces the burden of an increase in the production cost and effectively mitigates the risk of injury of an occupant attributable to the airbag.

Various aspects of the present invention provide for an airbag cushion for a vehicle, including a cushion body, a plurality of vent holes formed in the cushion body at opposite positions, a plurality of tubes connected to the cushion body in such a way that the tubes communicate with the respective vent holes, the tubes being deployed out of the vent holes by deployment of the cushion body so that gas is discharged out of the cushion body through the tubes, and a tether connecting the tubes to each other, the tether being cut when a pressure in the cushion body is a predetermined degree or more.

Furthermore, an inner diameter of each of the tubes may be reduced to an end thereof that is connected to the tether.

The tubes may be disposed in such a way as to face each other on opposite sides of the tether.

The tubes may be symmetric with respect to the tether.

Each of the tubes may have a free end formed on a first end thereof, and a fixed end formed on a second end thereof, and opposite ends of the tether may be connected to the respective free ends of the tubes.

The tether may have a perforated line to facilitate the cutting of the tether.

The tether may have cutting notches formed in opposite side edges thereof, and cutting slits formed at positions spaced apart from each other between the cutting notches.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
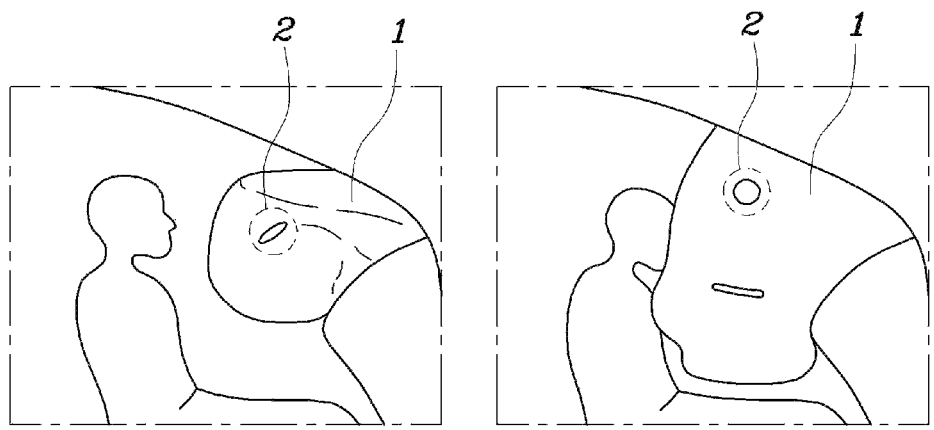
FIG. 1 is of views showing an example of a vehicle collision test to illustrate deployment of a conventional airbag cushion having a vent hole.
Figure 2:
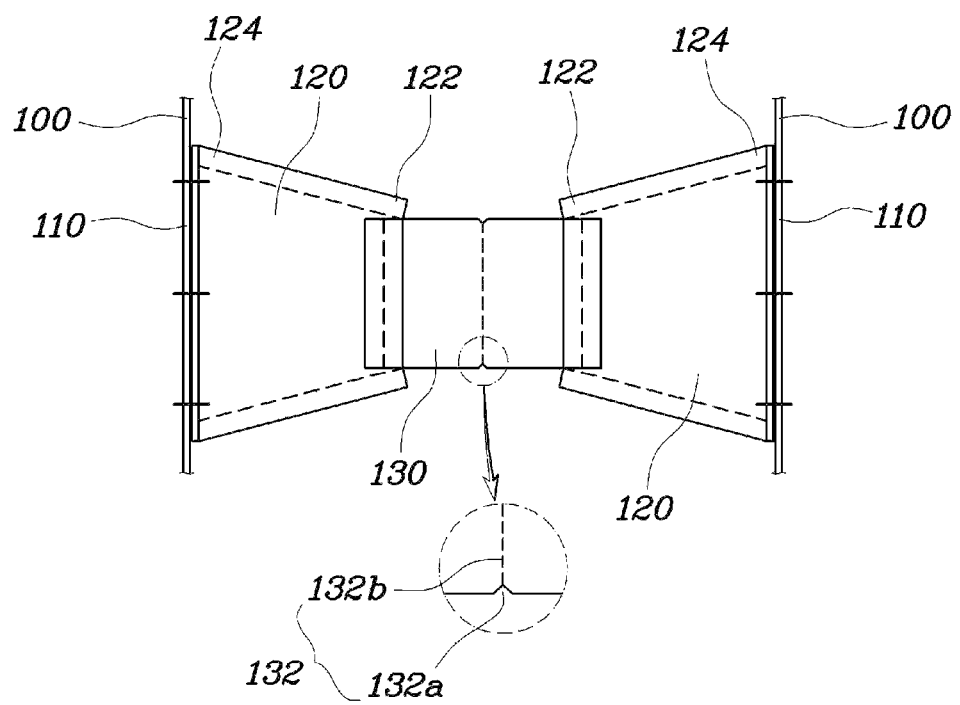
FIG. 2 is a schematic sectional view illustrating the structure of an exemplary airbag cushion according to the present invention.
Figure 3:
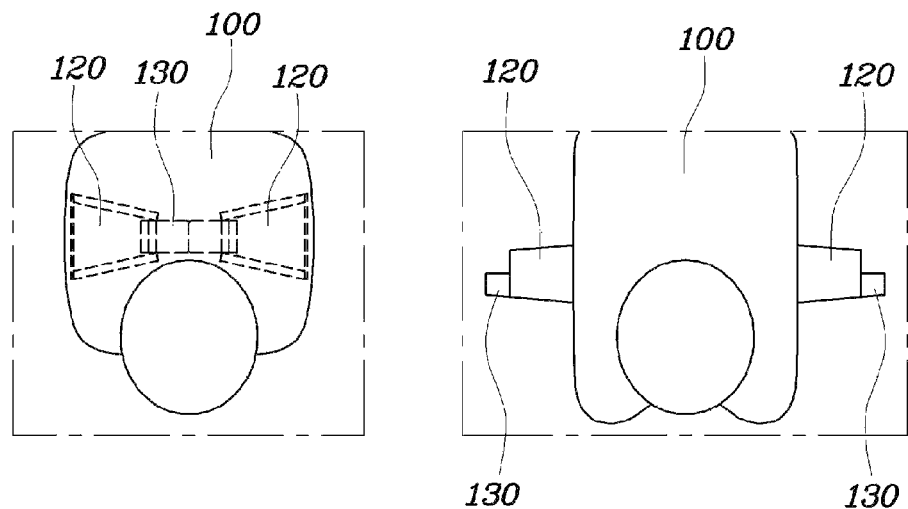
FIG. 3 is of views respectively showing the states of an exemplary airbag cushion of the present invention before it is in operation and when it is being operated.
Figure 4:
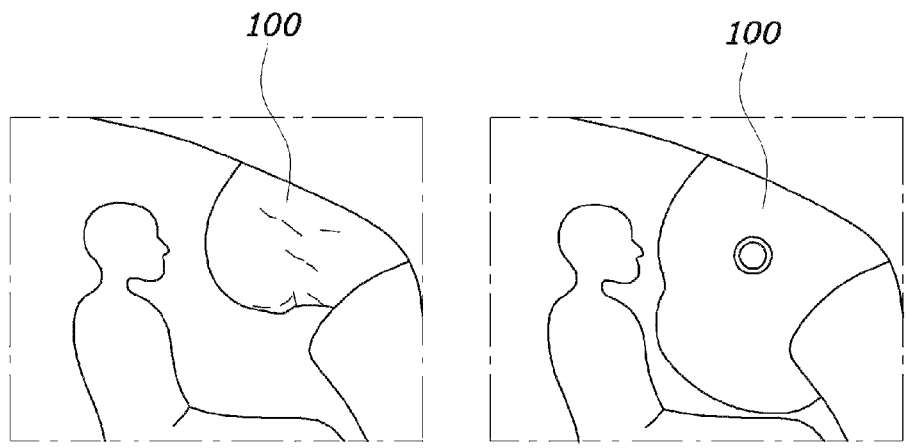
FIG. 4 is of views showing an example of a vehicle collision test to illustrate deployment of an exemplary airbag cushion according to the present invention.

FIGS. 2 through 4 illustrate an airbag cushion for a vehicle according to various embodiments of the present invention. The airbag cushion includes a cushion body 100, vent holes 110, tubes 120 and a tether 130.

As shown in FIGS. 2 and 3, the cushion body 100 deploys to protect an occupant in the vehicle in a vehicle collision. The cushion body 100 is maintained in a folded state in an airbag housing under normal conditions and is rapidly deployed towards the occupant to protect the occupant when a vehicle collision occurs.

The vent holes 110 are formed in the cushion body 100 at opposite positions so that when the cushion body 100 deploys, gas supplied into the airbag cushion 110 is discharged out of the airbag cushion 110 through the vent holes 110. In various embodiments, the vent holes 110 are respectively disposed on opposite sides of the cushion body 100.

The tubes 120 are made of the same material as that of the cushion body 100. The tubes 120 communicate with the respective vent holes 110 and are sewn to an inner surface of the cushion body 100. Each tube 120 has opposite ends including a free end 122 and a fixed end 124 and is configured in a tubular shape such that the free end 122 and the fixed end 124 communicate with each other. Thus, when the cushion body 100 deploys, the tubes 120 deploy out of the corresponding vent holes 110, and gas supplied into the cushion body 100 is discharged out of the cushion body 100 through the tubes 120.

Based on the structure of the cushion body 100 when it is not in deployment, the free end 122 of the tube 120 refers to an end of the tube 120 that is coupled to the tether 130, and the fixed end 124 thereof refers to an end of the tube 120 that is coupled to the corresponding vent hole 110.

The tube 120 has a tapered shape such that the inner diameter thereof is reduced from the fixed end 124 to the free end 122. The path along which gas is discharged out of the cushion body 100 is formed in the tube 120. Thanks to this structure, when the cushion body 100 deploys, gas can be discharged out of cushion body 100 at an appropriate speed rather than being too rapidly discharged out of the cushion body 100.

The tubes 120 are disposed in such a way as to face each other on opposite sides of the tether 130. In various embodiments, the tubes 120 are disposed in such a way as to face each other at the same angle on the same horizontal axis. Alternatively, the tubes 120 may be disposed in such a way as to face each other and be slanted at the same angle in opposite directions with respect to a common horizontal axis.

The tubes 120 may be symmetric with respect to the tether 130. In various embodiments, as shown in the drawings, the tubes 120 may be disposed on the same horizontal axis and be symmetric with respect to a vertical axis. Alternatively, the tubes 120 may be symmetrical with respect to a vertical axis in such a way that the tubes 120 are slanted at the same angle in the same direction with respect to the same horizontal axis.

The tether 130 is made of the same material as that of the cushion body 100 and is connected between the tubes 120 that are disposed at the opposite positions. Opposite ends of the tether 130 are sewed to the respective free ends 122 of the tubes 120 that are disposed at the opposite positions.

A perforated line 132 is formed in the tether 130 so that the tether 130 is cut along the perforated line 132 by tensile force generated as the cushion body 100 deploys. In various embodiments, although the perforated line 132 is illustrated as being oriented in a longitudinal direction perpendicular to the vent holes 110 that are disposed on the opposite sides of the tether 130, this is only one example of the configuration of the perforated line 132. Any configuration of the perforated line 132 should fall within the bounds of the present invention, so long as a line connecting the opposite ends of the perforated line 132 is oriented in a lateral direction crossing over upper and lower sides of the tether 130 that are not connected to the tubes 120.

For example, the perforated line 132 may be formed at an angle in the lateral direction of the tether 130. Alternatively, the perforated line 132 may be formed in a multi-stepped shape in the lateral direction of the tether 130.

To allow the tether 130 to be easily separated when necessary, the perforated line 132 comprises a plurality of cutting slits 132b which are formed at positions spaced apart from each other in the longitudinal line of the perforated line 132 at regular or irregular intervals. Furthermore, a triangular cutting notch 132a is formed in at least one end of the perforated line 132.

When the cushion body 100 deploys, gas is discharged towards the vent holes 110. Thereby, tensile force is applied to the tether 130 so that the opposite ends of the tether 130 are pulled away from each other. Then, the tensile stress is focused on the cutting slits 132b and the cutting notch 132a which are comparatively weak portions. As a result, the tether 130 is easily cut along the perforated line 132.

The tether 130 connects the free ends 122 of the tubes 120, which protrude inwards from the cushion body 100, to each other. The tether 130 has a length sufficient to apply tensile force to the tether 130 when the cushion body 100 deploys.

The operation and effect of the present invention having the above-mentioned construction will be described in detail below.

FIGS. 3 and 4 illustrate the operation of the airbag cushion according to the present invention. When gas is supplied into the cushion body 100 by an inflator in an initial stage of a vehicle collision, the tubes 120 are not yet deployed out of the vent holes 110, because the free ends 122 of the tubes 120 that protrude inwards from the cushion body 100 are connected to the tether 130. The vent holes 110 are still maintained in a closed state.

Therefore, in the initial stage of the deployment of the airbag cushion, because the pressure of gas supplied thereinto is not yet released out of the cushion body 100, the cushion body 100 rapidly deploys to form a predetermined shape which can support the weight of the occupant.

Subsequently, until the deployment of the airbag cushion is completed, the cushion body 100 is deployed outwards by the pressure of gas that is being rapidly injected into the cushion body 100, and the tubes 120 which are connected to the vent holes 110 of the cushion body 100 move outwards along with the cushion body 100 to a distance to which the vent holes 110 of the cushion body 100 move away from each other.

Here, because the tubes 120 are disposed at the opposite positions, and the tether 130 having the perforated line 132 is connected between the tubes 120, the tubes 120 ultimately pull the tether 130 in the opposite directions away from each other. Thereby, the tensile stress generated on the tether 130 is focused on the perforated line 132, thus resulting in the tether 130 separating into two.

In other words, because the perforate line 132 of the tether 130 comprises the cutting slits 132b and the cutting notch 132a which are weakest portions, the tether 130 cannot sustain the tensile force applied thereto by the tubes 120 being biased out of the vent holes 110 as the pressure of the rapidly inflating gas increases, and the tether 130 is ultimately severed along the perforated line 132.

As soon as the tether 130 is severed, the tubes 120 are exposed and deployed out of the vent holes 110 by the pressure of gas that is rapidly increasing in the cushion body 100, and the vent holes 110 completely open. Thereby, gas is rapidly discharged out of the cushion body 100 via the vent holes 110 and the tubes 120.

Moreover, the cushion body 100 can reliably support the weight of the occupant at the appropriate point of time at which a large amount of gas is discharged. Therefore, the risk of injury of the occupant resulting from the deployment of the cushion body 100 can be effectively mitigated.

As described above, in an airbag cushion according to the present invention, a tether having a perforated line is connected between tubes which are disposed at opposite positions. Therefore, in an initial stage of deployment of the airbag cushion, the airbag cushion rapidly deploys to protect an occupant. At the point of time at which the weight of the occupant is applied to the airbag cushion, the pressure in the airbag cushion is released by vent holes, thus effectively reducing the risk of the deployment of the airbag cushion injuring the occupant.

Moreover, opening of the vent holes of the airbag cushion is controlled by the tether made of the same material as that of the cushion body. Thus, a separate part, such as an active vent, is not required. Hence, the production cost and installation cost of an airbag module can be reduced.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. An airbag cushion for a vehicle, comprising:
   a cushion body;
   a plurality of vent holes formed in the cushion body at opposing positions;
   a plurality of tubes connected to the cushion body in such a way that the tubes communicate with the respective vent holes, the tubes being deployed out of the vent holes by deployment of the cushion body so that gas is discharged out of the cushion body through the tubes; and
   a tether directly connecting the tubes to each other, the tether being severed when a pressure in the cushion body reaches a predetermined threshold;
   wherein a second portion of each of the tubes is attached to the cushion body and a first portion of the each of the tubes is attached to the tether;
   wherein an inner diameter in the first portion of each of the tubes is smaller than an inner diameter in the second portion thereof when the tether is severed; and
   wherein the tether has a perforated line to facilitate the severing of the tether.

2. The airbag cushion as set forth in claim 1, wherein the tubes are disposed in such a way as to face each other on opposite sides of the tether.

3. The airbag cushion as set forth in claim 1, wherein the tubes are symmetric with respect to the tether.

4. The airbag cushion as set forth in claim 1, wherein each of the tubes has a free end formed on a first end thereof, and a fixed end formed on a second end thereof, and wherein opposite ends of the tether are connected to respective free ends of respective tubes.

5. The airbag cushion as set forth in claim 1, wherein the tether has cutting notches formed in opposite side edges thereof, and cutting slits formed at positions spaced apart from each other between the cutting notches.

\* \* \* \* \*